United States Patent
Poag et al.

[11] Patent Number: 6,025,665
[45] Date of Patent: Feb. 15, 2000

[54] ROTATING MACHINE FOR USE IN A PRESSURIZED FLUID SYSTEM

[75] Inventors: Andrew F. Poag; Scott E. Eckles, both of St. Louis, Mo.; Lee Phillips, Avon, N.Y.; Joseph Tevaarwerk, Clayton, Mo.

[73] Assignee: Emerson Electric Co., St. Louis, Mo.

[21] Appl. No.: 08/803,671

[22] Filed: Feb. 21, 1997

[51] Int. Cl.$^7$ .............................. H02K 5/00; H02K 5/16; H02K 11/00

[52] U.S. Cl. ........................... 310/89; 310/90; 310/68 B; 310/71

[58] Field of Search ............................. 310/89, 90, 68 B, 310/156, 254, 258, 259, 71; 417/366, 423.3, 423.12, 423.14

[56] References Cited

U.S. PATENT DOCUMENTS

| | | | |
|---|---|---|---|
| 3,183,384 | 5/1965 | Flaherty, Jr. .............................. | 310/90 |
| 4,209,722 | 6/1980 | Peacheee, Jr. ............................ | 310/90 |
| 4,515,486 | 5/1985 | Russell .................................... | 384/117 |
| 4,533,183 | 8/1985 | Brown et al. ............................. | 360/98 |

(List continued on next page.)

FOREIGN PATENT DOCUMENTS

| | | |
|---|---|---|
| 0038306 | 10/1981 | European Pat. Off. . |
| 0206516 | 12/1986 | European Pat. Off. . |
| 0445733 | 9/1991 | European Pat. Off. . |
| 0508250 | 10/1992 | European Pat. Off. . |

(List continued on next page.)

OTHER PUBLICATIONS

Patent Abstracts of Japan, vol. 10, No. 297, Publication No. 61112547, Nov. 7, 1984.
Patent Abstracts of Japan, vol. 11, No. 870, (P–642) (2817), Dec. 3, 1987.
Journal of Japansese Society of Tribologists, vol. 34, No. 2, Feb. 15, 1989, pp. 49–52.
Ebara Engineering Review, No. 143, Apr. 1989, pp. 16–20.
BESAM Motor schematic drawing and photographs, May 25, 1990.

*Primary Examiner*—Clayton LaBalle
*Attorney, Agent, or Firm*—Arnold White & Durkee; Mark L. Gleason

[57] ABSTRACT

A rotating machine includes an endshield assembly, a stator assembly, and a rotor assembly including a shaft. The endshield assembly includes an endwall having a substantially planar surface and a cylindrical endshield protrusion projecting along a longitudinal axis substantially perpendicular to the planar surface from a substantially central position on the endwall. The stator assembly is connected to the endshield assembly and has a substantially cylindrical main body extending from the endwall along the longitudinal axis substantially perpendicular to the planar surface. The rotor assembly is positioned within a central cavity of the stator assembly and arranged for rotation relative to the stator assembly. The shaft extends from the rotor assembly and passes through the cylindrical endshield protrusion. An outer surface of the shaft and an inner surface of the cylindrical endshield protrusion form a hydrodynamic bearing when the rotating machine is immersed in fluid.

Also, a rotating machine includes an endshield assembly having first and second locating features. A sensor assembly is mounted to the endshield assembly. The sensor assembly cooperates with the first locating feature to locate the sensor assembly in a known position on the endshield assembly. A stator assembly has a third locating feature. The second and third locating features cooperate to locate the stator in a known position with respect to the endshield assembly. A rotor assembly is positioned within a cavity of the stator assembly proximate to the sensor assembly, and arranged for rotation relative to the stator assembly.

17 Claims, 14 Drawing Sheets

U.S. PATENT DOCUMENTS

| | | | |
|---|---|---|---|
| 4,599,664 | 7/1986 | Schuh | 360/97 |
| 4,645,960 | 2/1987 | Hoffman | 310/90.5 |
| 4,652,149 | 3/1987 | Nakaoka | 384/100 |
| 4,656,545 | 4/1987 | Kakuta | 360/98 |
| 4,698,542 | 10/1987 | Muller | 310/67 |
| 4,719,396 | 1/1988 | Shimizu | 318/432 |
| 4,820,949 | 4/1989 | Mizabachi et al. | 310/90 |
| 4,881,001 | 11/1989 | Patel et al. | 310/258 |
| 4,922,406 | 5/1990 | Schuh | 360/97.03 |
| 4,939,436 | 7/1990 | Morishita et al. | 318/434 |
| 4,952,830 | 8/1990 | Shirakawa | 310/68 B |
| 4,954,736 | 9/1990 | Kawamoto et al. | 310/156 |
| 4,998,033 | 3/1991 | Hisabe et al. | 310/67 |
| 5,012,359 | 4/1991 | Kohno et al. | 360/71 |
| 5,046,863 | 9/1991 | Sakatani et al. | 384/101 |
| 5,089,732 | 2/1992 | Konno et al. | 310/67 R |
| 5,112,200 | 5/1992 | Isaacson et al. | 417/356 |
| 5,157,292 | 10/1992 | Morrill | 310/261 |
| 5,158,440 | 10/1992 | Cooper et al. | 417/423.1 |
| 5,257,828 | 11/1993 | Miller et al. | 180/79.1 |
| 5,325,005 | 6/1994 | Denk | 310/68 B |
| 5,366,298 | 11/1994 | Toshimitsu et al. | 384/107 |
| 5,397,951 | 3/1995 | Uchida et al. | 310/156 |
| 5,461,270 | 10/1995 | Didier | 310/68 B |
| 5,473,231 | 12/1995 | McLaughlin et al. | 318/433 |
| 5,475,289 | 12/1995 | McLaughlin et al. | 318/432 |
| 5,576,586 | 11/1996 | Blumenberg | 310/88 |
| 5,654,599 | 8/1997 | Casper | 310/68 B |
| 5,864,192 | 1/1999 | Nagate et al. | 310/156 |

FOREIGN PATENT DOCUMENTS

| | | |
|---|---|---|
| 0410293 | 9/1993 | European Pat. Off. . |
| 0600468 | 6/1994 | European Pat. Off. . |
| 0611691 | 8/1994 | European Pat. Off. . |
| 0551550 | 12/1995 | European Pat. Off. . |
| 0689986 | 1/1996 | European Pat. Off. . |
| 0695679 | 2/1996 | European Pat. Off. . |
| 0709278 | 5/1996 | European Pat. Off. . |
| 0710599 | 5/1996 | European Pat. Off. . |
| 2278128 | 7/1974 | France . |
| 3248186 | 12/1982 | Germany . |
| 3600721 | 6/1990 | Germany . |
| 59-28757 | 2/1984 | Japan . |
| 63-87162 | 4/1988 | Japan . |
| 63-100416 | 5/1988 | Japan . |
| 63-241515 | 10/1988 | Japan . |
| 63-241516 | 10/1988 | Japan . |
| 63-241517 | 10/1988 | Japan . |
| 58-5518 | 1/1993 | Japan . |
| 1575034 | 9/1980 | United Kingdom . |
| 2237849 | 9/1993 | United Kingdom . |
| WO95/03917 | 2/1995 | WIPO . |
| WO95/11152 | 4/1995 | WIPO . |

ROTATING MACHINE FOR USE IN A PRESSURIZED FLUID SYSTEM

CROSS REFERENCE TO RELATED APPLICATIONS

This application is related to co-pending U.S. patent application Ser. No. 08/803,683, filed on Feb. 21, 1997, and entitled "Rotor Assembly for a Rotating Machine," the entire disclosure of which is incorporated herein by reference.

FIELD OF THE INVENTION

The present invention relates in general to rotating machines, and more specifically to rotating machines suitable for operation while immersed in an operating fluid.

BACKGROUND OF THE INVENTION

Rotating machines are commonly used to drive rotational loads such as pump impellers. In certain applications, the process fluid pumped by the impeller is not compatible with elements of the rotating machine. In such applications, the rotating machine must be isolated from the process fluid. Otherwise, the elements of the rotating machine must be constructed of materials compatible with the fluid. This specification describes a rotating machine adapted for use in an electro-hydraulic power steering unit, however other applications are contemplated.

In typical power steering pump designs, the motor drive has two endshields and uses ball bearings to reduce friction generated by rotation of the shaft. The motor is generally separated from the fluid by a seal on the shaft. The use of a ball bearing motor in the presence of hydraulic fluid limits the life expectancy of the ball bearings. Leakage of the hydraulic fluid past the shaft seal will contaminate the bearing lubricant, leading to the eventual demise of the ball bearings. It is therefore desirable for a rotating machine adapted for use in a pump application to be compatible with the process fluid being pumped. It s further desirable for a rotating machine adapted for use in a pump application to be capable of being immersed in the process fluid, thus obviating the need for a seal between the rotating machine and the pump.

In rotating machines using permanent magnet motors, it is common to attach permanent magnets on a rotor member to form a rotor assembly. The permanent magnets may be attached by retaining members or adhesives. In the process of attaching the magnets, the thickness and uniformity of the adhesive layer greatly determines the shear strength of the adhesive. It is desirable to control the thickness and uniformity of the adhesive layer to ensure adequate adhesion. It is also desirable to provide a back-up retention means should the adhesive layer fail.

Another important aspect in the assembly of a rotating machine lies in assuring alignment between the stator of the machine and the position sensors used to indicate the relative position of the rotor during operation and control of the machine. Typically Hall effect sensors are placed near the rotor to sense magnetic field changes caused by the interaction between the magnets on the rotor and the stator poles, thus allowing the control electronics to time the switching on and off of the phase windings to control machine torque and speed. The alignment of the sensors relative the stator is crucial to is this timing process. Typically, the sensors are adjusted after fabrication of the rotating machine to ensure the proper timing. It is desirable for a rotating machine to have features which align the stator poles relative to the position sensors during the assembly process, thus obviating the need for further adjustment after assembly has been completed.

SUMMARY OF THE INVENTION

The present invention in a broad aspect addresses the problems and shortcomings mentioned above. More specifically, an aspect of the invention is seen in a rotating machine comprising an endshield assembly, a stator assembly, and a rotor assembly including a shaft. The endshield assembly includes an endwall and a cylindrical endshield protrusion projecting therefrom. The stator assembly is connected to the endshield assembly and has a main body extending from the endwall substantially parallel to the endshield protrusion. The rotor assembly is positioned within a central cavity of the stator assembly and arranged for rotation relative to the stator assembly. The shaft extends from the rotor assembly and passes through the cylindrical endshield protrusion.

Another aspect of the invention is seen in a rotating machine, comprising an endshield assembly having first and second locating features. A sensor assembly is mounted to the endshield assembly. The sensor assembly cooperates with the first locating feature to locate the sensor assembly in a known position on the endshield assembly. A stator assembly has a third locating feature. The second and third locating features cooperate to locate the stator in a known position with respect to the endshield assembly. A rotor assembly is positioned within a cavity of the stator assembly proximate to the sensor assembly, and arranged for rotation relative to the stator assembly.

A further aspect of the invention is seen in a rotating machine comprising an endshield assembly, a stator assembly having a main body connected to the endshield assembly, a rotor assembly positioned within a central cavity of the stator and arranged for rotation relative to the stator, a sensor assembly connected to the endshield assembly proximate to the rotor assembly, and a sensor assembly locator extending from a surface of the endshield assembly for locating and aligning the sensor assembly in a known position relative to the stator assembly.

Still another aspect of the invention is seen in a method of positioning a sensor assembly within a rotating machine. The method includes positioning a sensor locator body of the sensor assembly on a sensor assembly locator. The sensor assembly locator is positioned and aligned on a surface of an endshield assembly of the rotating machine, and the sensor locator body is secured to the sensor assembly locator.

An aspect of the invention is seen in a method of assembling a stator assembly and an endshield assembly of a rotating machine. A locating feature of the stator assembly is aligned with a locating feature of the endshield assembly. The stator assembly and endshield assembly are moved into engagement such that the locating feature of the stator assembly cooperatively engages the locating feature of the endshield assembly, and the stator assembly and endshield assembly are secured together.

A further aspect of the invention is a pressurized fluid system including a system housing, a fluid pump and a rotating machine. The system housing is substantially filled with an operating fluid and exhibits a fluid inlet and a fluid outlet. The fluid pump is substantially submerged in the operating fluid within the housing and exhibits a fluid outlet corresponding to the fluid outlet of the housing. The rotating machine is also substantially submerged in the operating fluid within the housing and is operatively connected to the fluid pump.

BRIEF DESCRIPTION OF THE DRAWINGS

The foregoing and other advantages of the invention will become apparent upon reading the following detailed description and upon reference to the drawings in which:

FIG. 4b illustrates a circuit diagram of the phase windings of the stator assembly of FIG. 4a;

DESCRIPTION OF ILLUSTRATIVE EMBODIMENTS

Illustrative embodiments of the invention are described below as they might be employed in a rotating machine. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Figure 1:
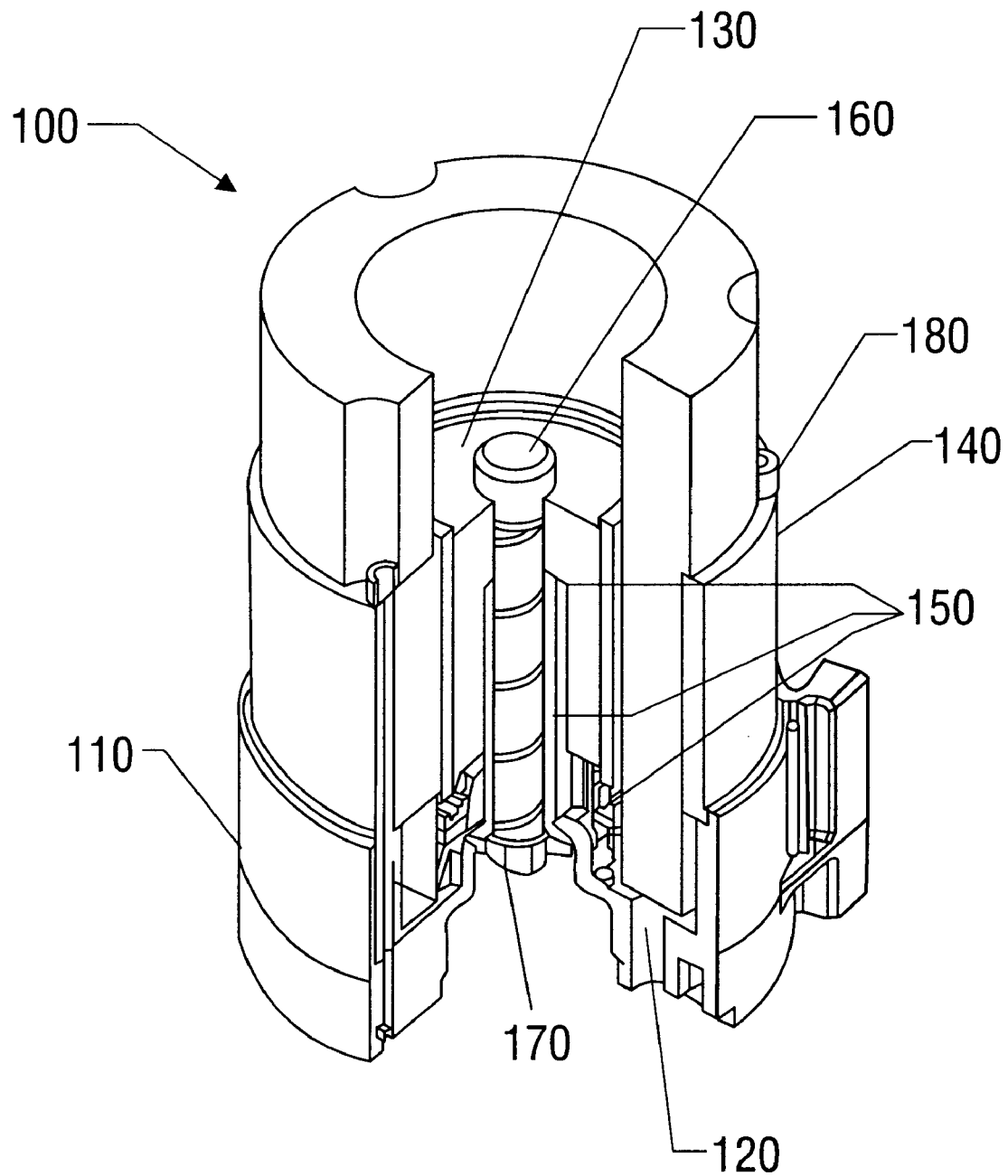
FIG. 1 illustrates a sectional isometric view of a rotating machine according to an embodiment of the present invention.

Turning now to the drawings and referring initially to FIG. 1, a pictorial representation of a rotating machine 100 in accordance with an embodiment of the present invention is provided. The illustrated embodiment shows a rotating machine 100 adapted for use in an electro-hydraulic power steering unit The rotating machine 100 operates while immersed in hydraulic fluid. The hydraulic fluid lubricates and cools the components of the rotating machine during operation. It is contemplated that the rotating machine 100 of the invention has applications to a variety of situations including other harsh environments. It is appreciated that other applications can be made in other situations in light of the description of the invention herein.

The rotating machine 100 comprises four basic components: an endshield assembly 110, a sensor assembly 120, a rotor assembly 130, and a stator assembly 140. As illustrated in FIG. 1, the sensor assembly 120 is located substantially within and is affixed to the endshield assembly 110. The rotor assembly 130 includes a spiral-grooved shaft 160 which extends through an endshield protrusion 150 to form a hydro-dynamic bearing unit when the rotating machine 100 is operated while immersed in fluid (e.g. hydraulic fluid). The fluid acts as both a lubricant and a coolant. The rotor assembly 130 is axially secured in relation to the endshield 110 by a clip 170 positioned near one end of the shaft 160 beneath the endshield assembly 110. The stator assembly 140 surrounds the rotor assembly 130 and may be secured to the endshield 110 by a plurality of fasteners such as bolts 180.

Figure 2B:
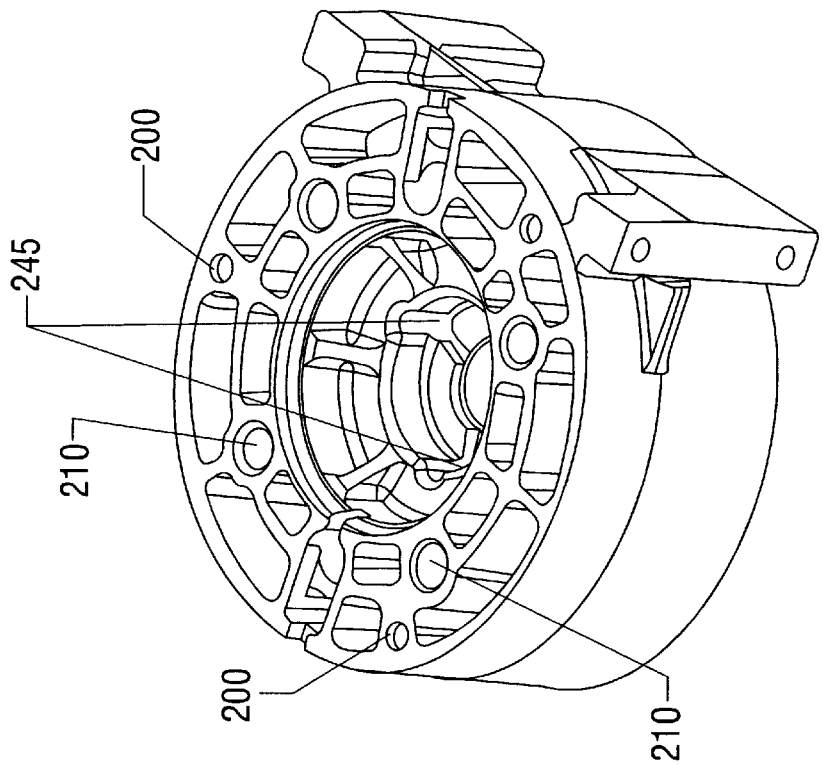
FIGS. 2a and 2b illustrate top and bottom isometric views of an endshield assembly of the rotating machine of FIG. 1.
Figure 2A:
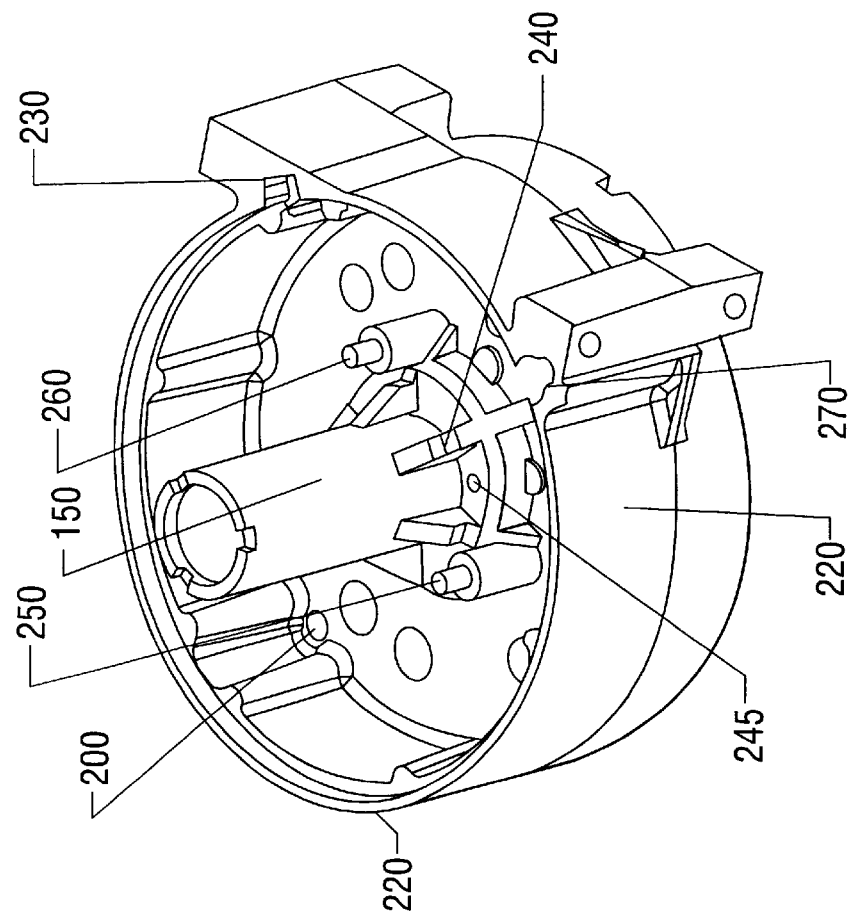

Referring to FIGS. 2a and 2b, the endshield assembly 110 is shown in greater detail. In the illustrated embodiment, the endshield assembly 110 is formed from cast aluminum. Other materials and methods of construction are contemplated depending on the specific motor environment. The endshield assembly 110 exhibits several stator bolt holes 200 for attaching the endshield assembly 110 to the stator assembly 140 via bolts 180 and several load bolt holes 210 for securing the endshield assembly 110 to a load (e.g. pump apparatus) attached to the rotating machine 100. Additional circulation holes 245 are also defined in the endshield assembly 110 to allow fluid to circulate into and out of the cavities formed by the endshield walls 220 and the endshield protrusion 150.

The endshield walls 220 include recesses that are designed to receive the stator assembly 140. Formed within the endshield walls 220 is a stator assembly locating notch 230 that is used during assembly to orient the stator assembly 140 with respect to the endshield assembly 110.

Figure 3:
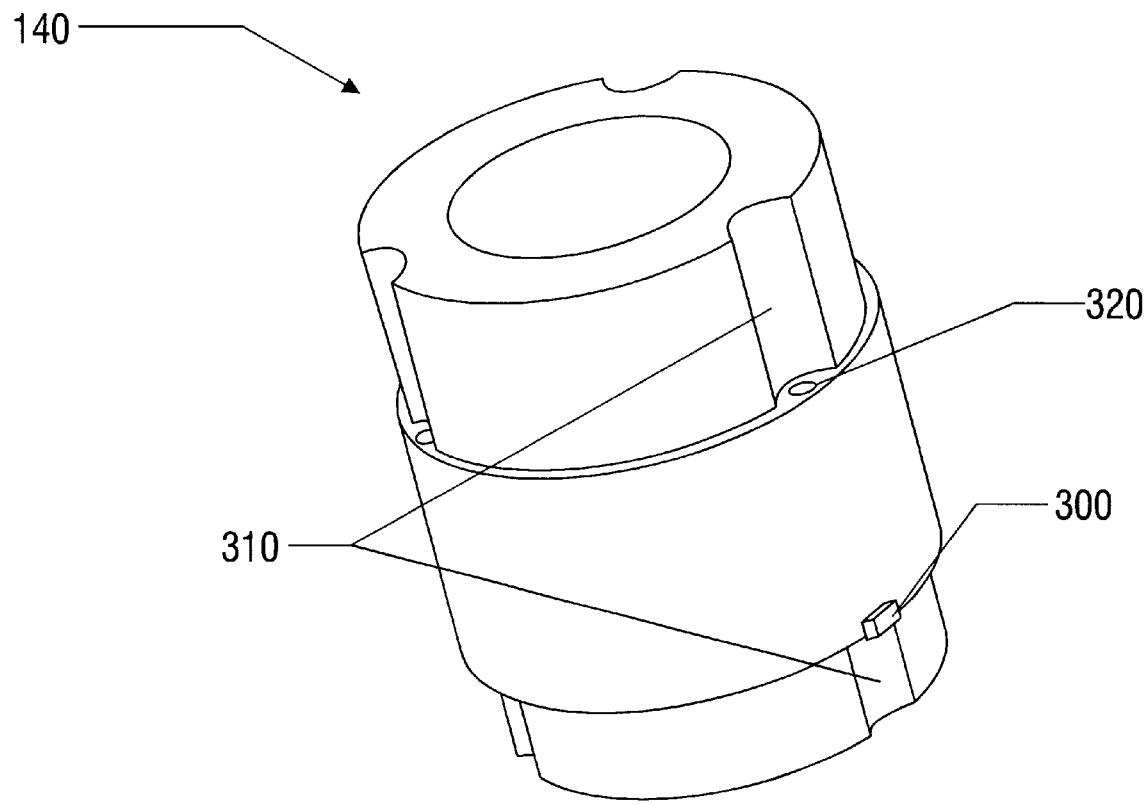
FIG. 3 illustrates a simplified isometric view of a stator assembly of the rotating machine of FIG. 1.

Referring now to FIG. 3, a simplified view of the stator assembly 140 is provided. Tab 300 extends from the stator assembly 140 and fits within the stator assembly locating notch 230 to ensure that the stator assembly 140 is in a known position with respect to the endshield 110 when the rotating machine 100 is assembled. The stator assembly 140 is constructed in conventional fashion such as from laminated stock The stator assembly 140 defines bolt clearances 310 to allow bolts to be inserted through holes 320 and corresponding stator bolt holes 200 in the endshield 110 in order to fasten the stator assembly 140 to the endshield 110.

Figure 4B:
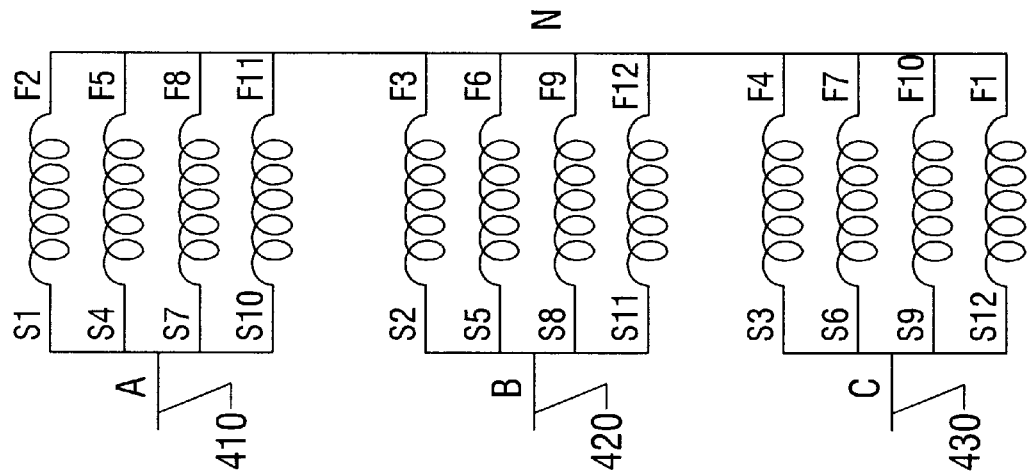
Figure 4A:
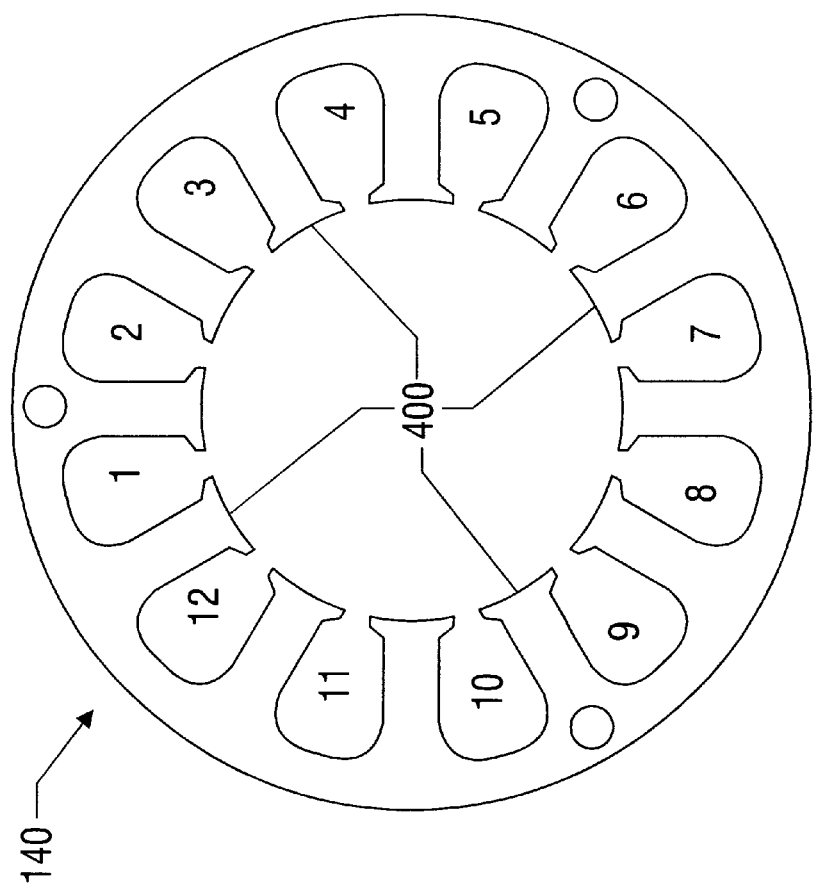
FIG. 4a illustrates a diagram of the phase winding arrangement of the stator assembly of FIG. 3.

FIG. 4a provides a diagram of the stator assembly 140 and FIG. 4b illustrates a circuit diagram of the phase windings. The stator assembly 140 includes a twelve slot, eight pole stator, having three phase windings 410, 420, 430 where each phase winding comprises four coils connected in parallel and where each coil is wound about a single stator tooth 400. The three phase windings 410, 420, 430 are Wye connected. In the illustrated embodiment each coil consists of 13 turns of: 1 of AWG 14.5; or 2 of AWG 7.5; or 4 of AWG 20.5.

Returning to FIG. 2, two sensor assembly locating features are provided within the cavity formed by the walls 220 of the endshield 110. These features each comprise a rest 240 and two posts 250, 260.

Figure 5:
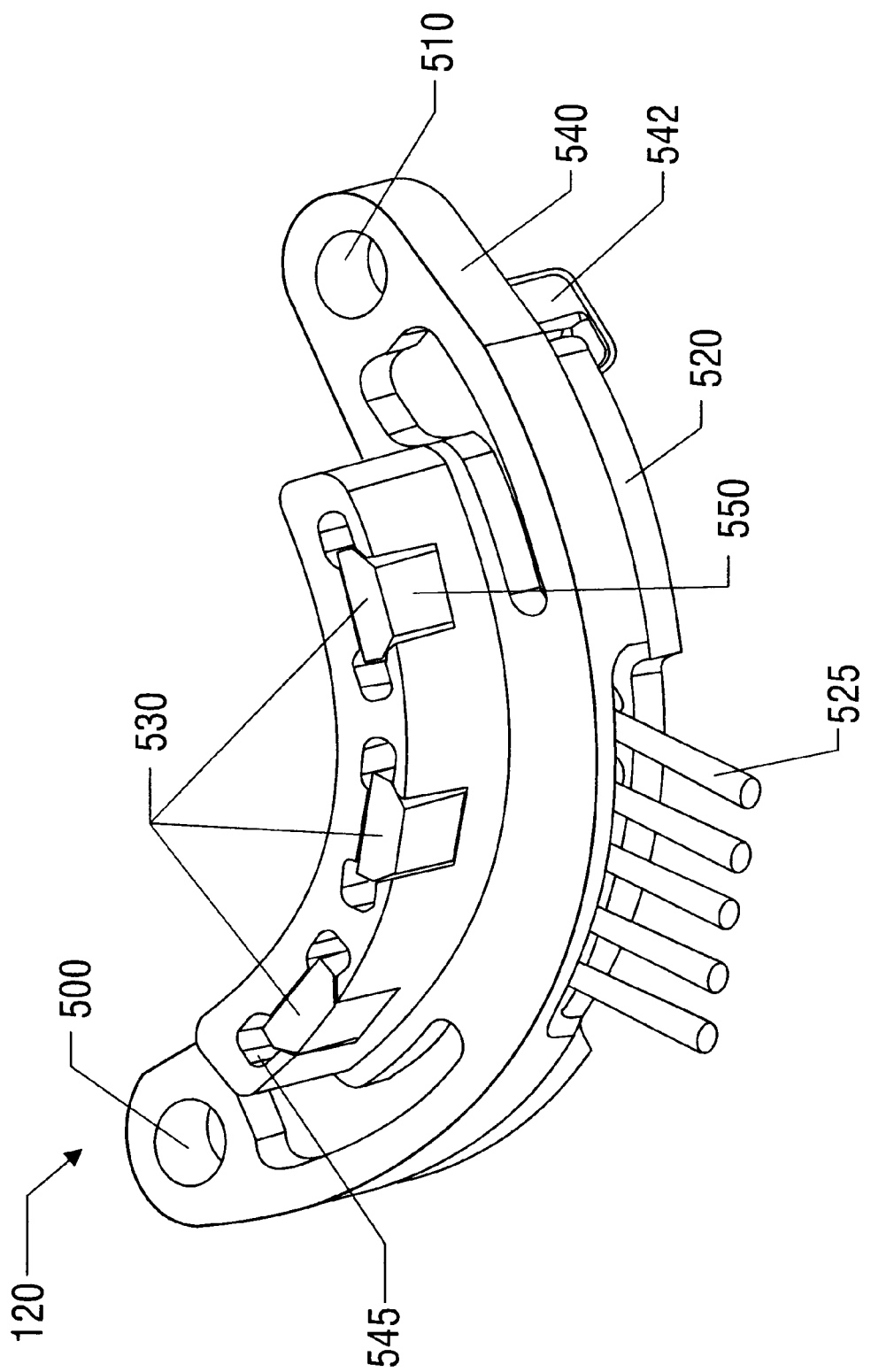
FIG. 5 illustrates an isometric view of an embodiment of a sensor assembly of the rotating machine of FIG. 1.

The sensor assembly 120 is shown in FIG. 5, and includes a locator body 540 having a pair of openings 500, 510 therein of a diameter substantially equal to the outer diameter of the two posts 250, 260. The sensor assembly 120 also includes a printed circuit board (PCB) array 520 with PCB lead wires 525 and three Hall effect devices 530. The locator body 540 is a molded plastic part that is formed such that it defines three pockets 545 which receive the three Hall effect devices 530 and positively locate the Hall effect devices 530 in the locator body 540. The center of each pocket is positioned at 30° from the adjacent pockets to control the frequency of the generated signals. The locator body 540 is preferably formed of glass-filled nylon or an engineering-approved equivalent material. In addition to positively positioning the Hall devices 530, the plastic locator body 540 prevents the PCB leads 525 from contacting the rotor assembly 130.

Figure 6:
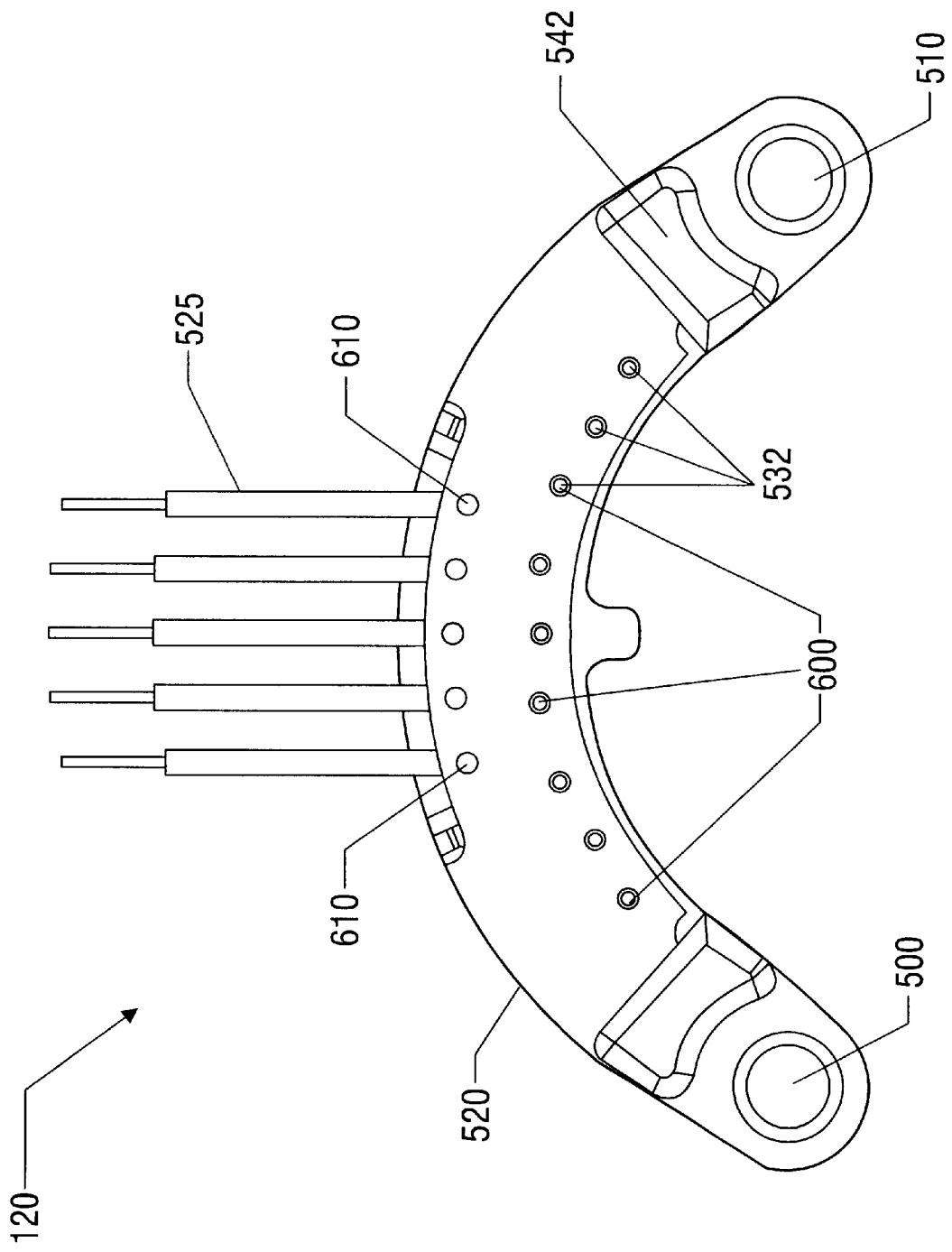
FIG. 6 illustrates a bottom view of the sensor assembly of FIG. 5.

As shown in FIG. 6, the PCB array 520 has openings 600 therein sized to accommodate leads which extend from the Hall effect devices 530. The PCB array 520 also has openings 610 therein for receiving the ends of the PCB lead wires 525. The PCB array 520 is received by an appropriately formed recess in the plastic locator 540. This arrangement allows for selective soldering to be used to couple the leads from the Hall devices 530 and the PCB leads 525 to the PCB array 520.

The sensor assembly 120 is assembled prior to its placement into the endshield assembly 110 of the rotating machine 100. According to one preferred assembly method, the lead wires 525 are first mechanically connected to the PCB array 520 via openings 610 therein, as shown in FIG. 6. The PCB array 520 is then snapped into engagement with the arms 542 on the underside of the locator body 540. The Hall effect devices 530 are then inserted into the pockets of the locator body 540, such that movement of the Hall effect devices is restricted or prohibited and the lead wires 532 of the Hall effect devices extend through the openings 600 in the PCB array 520. The lead wires 525 are then electrically connected to the Hall effect leads 532 by application of a solder to the surface of the PCB array 520.

Figure 13:
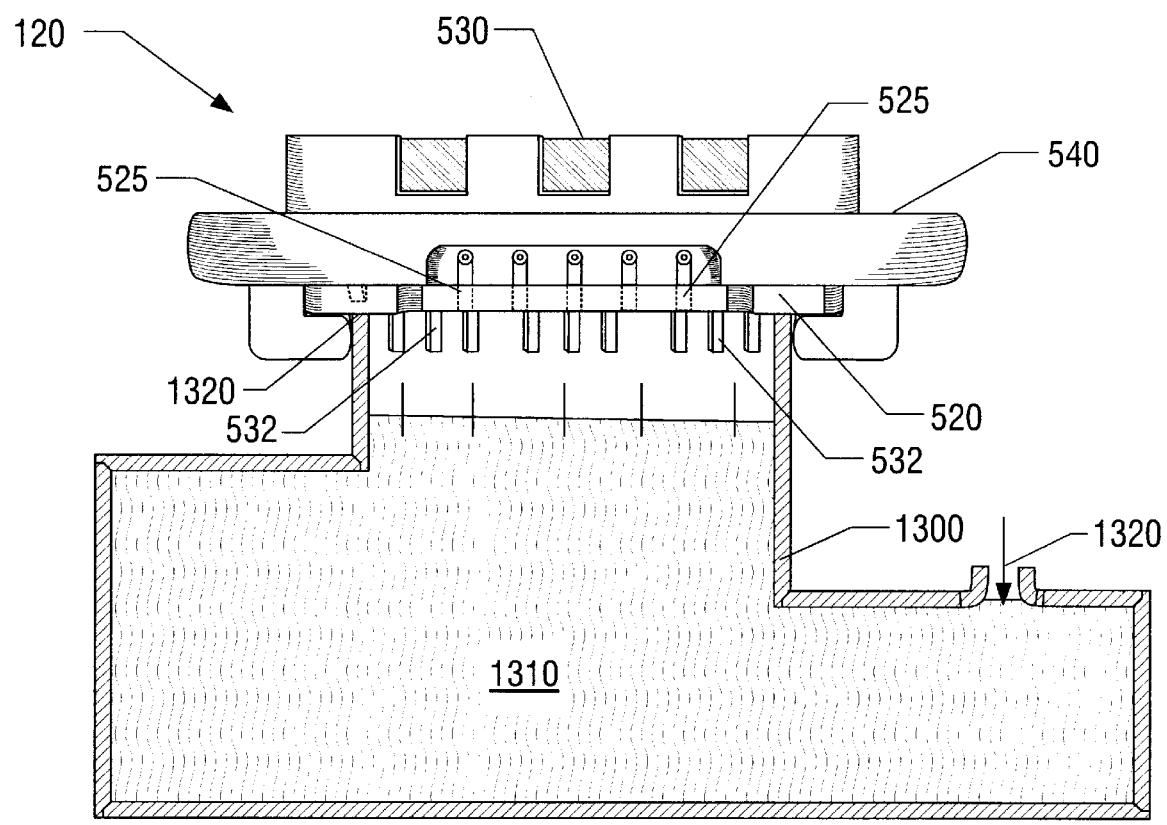
FIG. 13 illustrates a selective solder bath system used to couple the leads from the Hall effect devices and the printed circuit board leads to the printed circuit board array.

Because the sensor assembly will later be inserted into a rotating machine that is designed to be immersed in operating fluid, with specific cleanliness requirements it is important that the soldering process does not resulting in flaking or balling of solder particles. Therefore, selective soldering is preferably used to electrically connect the lead wires to the Hall effect leads. As shown in FIG. 13, the selective soldering process is carried out by using a cookie-cutter like pattern 1300 sealed against the surface of the PCB array 520 to control the application of solder, thus preventing solder from coming into contact with other parts of the sensor assembly 120 such as the locator body 540. The cookie cutter pattern 1300 is placed above a solder bath 1310, and the PCB array 520 is placed over the top of the cookie cutter pattern 1300 and sealed against the upper edge 1320 thereof. The solder bath 1310 is then pressurized 1320, causing a wave of solder to rise from the solder bath within the cookie cutter pattern 1300 and into contact with the surface of the PCB array 520 and the protruding ends of the lead wires 525 and Hall effect device leads 532 thereby electrically and mechanically connecting lead wires 525 to openings 610 and Hall effect leads 532 to openings 600. The PCB array 520 includes the required connections between the lead wires 525 and the Hall effect leads 532.

After the sensor assembly 120 has been assembled, it is positioned within the endshield 110 by placing the mounting holes 500, 510 of the plastic locator about the positioning posts 250, 260 of the endshield 110. The locator body is then secured to the positioning posts 250, 260. Preferably, the posts 250, 260 are deformed by spin riveting to secure the sensor assembly 120 to the endshield 110. Deformation of the posts is preferred since the number of parts used in the assembly is reduced, thereby alleviating concerns of parts coming loose in the rotating machine during operation. Alternatively, separate fasteners, such as locking washers or screws may be used to secure the locator body to the positioning posts. The manner in which the sensor assembly 120 is positioned within the endshield 110 is reflected FIG. 7.

Figure 7:
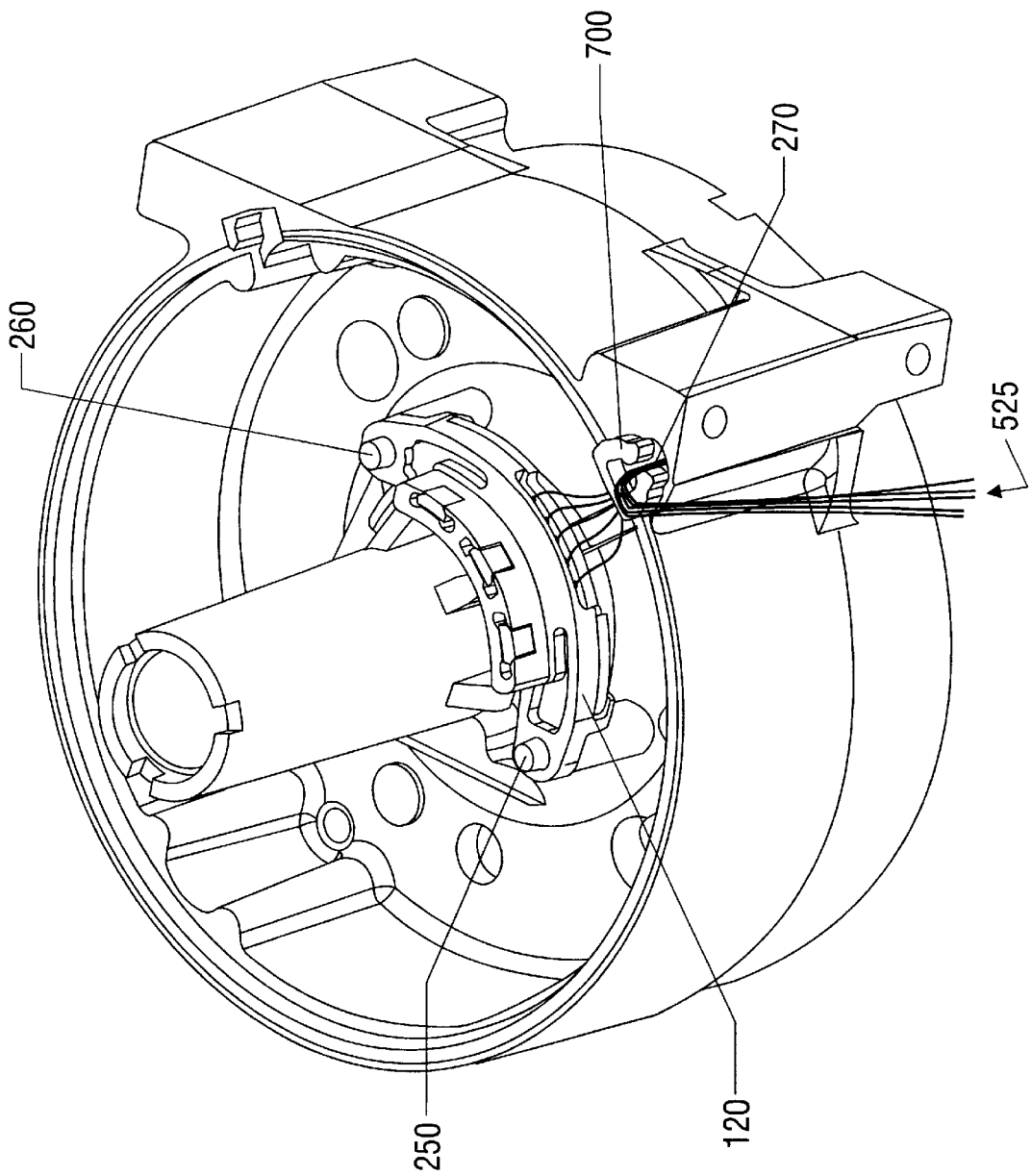
FIG. 7 illustrates an isometric view of the sensor assembly of FIG. 5 positioned within the endshield assembly of FIG. 2a and including wire leads exiting the endshield assembly.

As shown in FIG. 7, a channel 270 is formed along the interior wall of the endshield 110 to allow the PCB leads 525 to exit the rotating machine 100 for connection to a controller. A slotted grommet 700 is inserted into the channel 270 and surrounds the lead wires in the channel. The grommet 700 may be formed of any material that meets chemical compatibility and temperature conditions for submersible use in an electro-hydraulic motor. The preferred material for the grommet 700 is glass filled nylon. The PCB leads 525 can be inserted into the grommet 700 through the slot therein, and the grommet 700 inserted into the channel 270 through the opening therein. This assembly obviates threading of the PCB leads through a hole in the endshield or other portion of the rotating machine, thus simplifying assembly of the rotating machine. The grommet 700 also inhibits chaffing of the PCB leads 525 and pinching of the wires 525 between the endshield 110 and the stator assembly 140.

Figure 8:
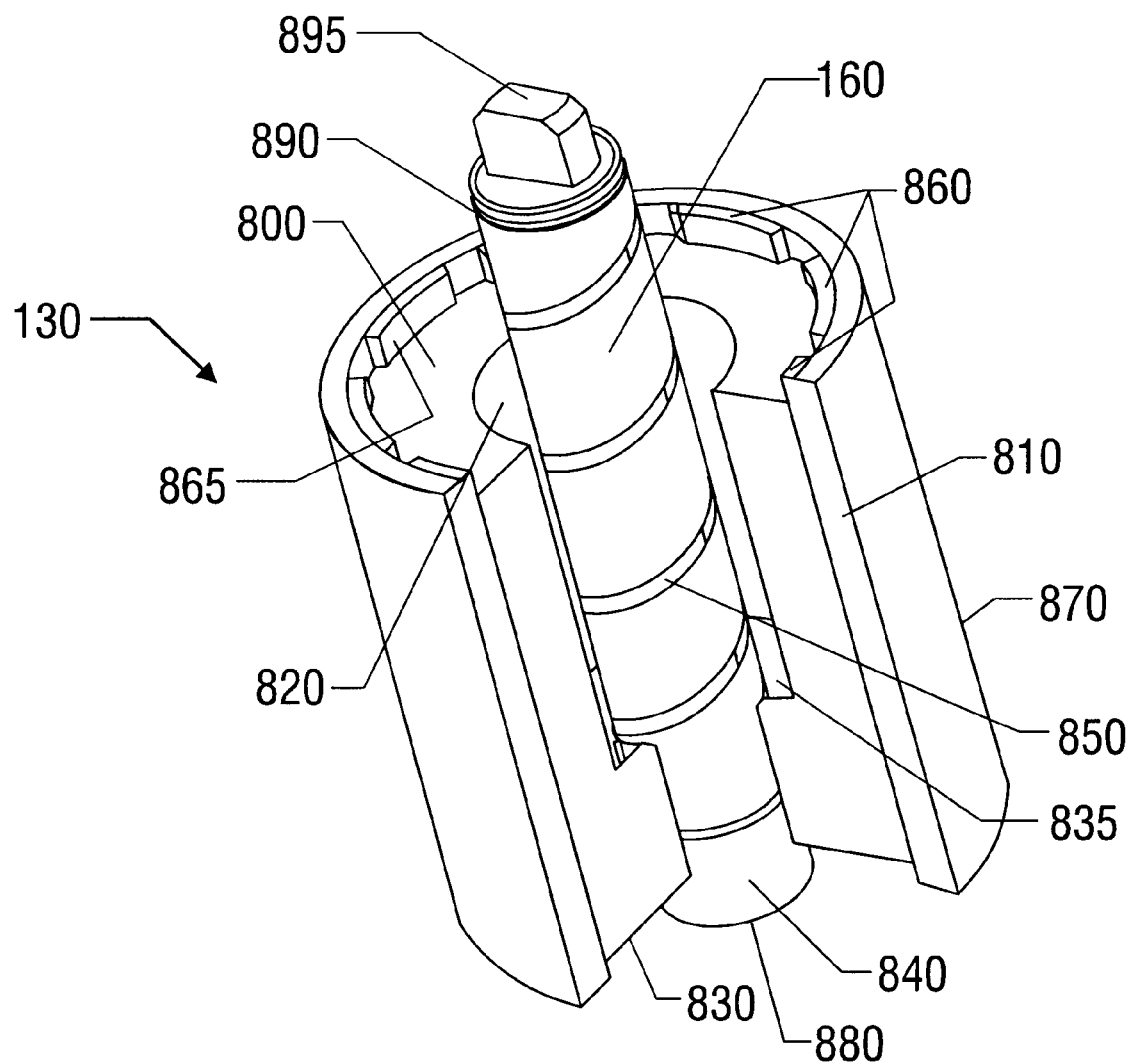
FIG. 8 illustrates a sectional isometric view of one embodiment of a rotor assembly of the rotating machine of FIG. 1.

Referring to FIG. 8, a cut-out view of the rotor assembly 130 is shown. The rotor assembly 130 includes a substantially cylindrical rotor member 800 having an outer surface 810 and an interior surface 820. The rotor member 800 may be formed of a metallic material having good magnetic properties, such as powdered metal. One such preferred material is magnetic iron grade, 7.2 g/cc min. or an engineering approved equivalent. Although the rotor member 800 shown in FIG. 8 comprises a solid metallic member, the rotor member may also comprise a laminated construction wherein a plurality of metallic discs are arranged in a stacked configuration and separated by alternating insulation discs. The interior surface 820 includes a stepped portion 830 at one end thereof, the inner surface of which frictionally engages the outer surface 840 of the rotor shaft 160.

The shaft 160 has a first end 880 with a tapered or beveled edge, and a second end 890 which includes a tang 895 that may be configured to engage the shaft of a load (i.e. pump) to transmit the required torque and speed to the load. The shaft 160 is formed from heat treated metal, and preferably case hardened steel, that is hardened and ground to act as a suitable bearing journal. The shaft 160 is heat treated to provide a hard outer surface and a softer core. According to one embodiment, the shaft may be case hardened to about HRC 55 with a case depth of between about 0.50 mm and 0.63 mm, with a core hardness of between about HRC 30 and HRC 38. The hard outer surface of the shaft 160 forms a hydrodynamic bearing with the aluminum inner surface of the endshield protrusion 150. The interaction between the hard outer surface of the shaft 160 and the softer aluminum surface of the endshield protrusion 150 is necessary to prevent galling or surface destruction during use of the rotating machine 100, and particularly during start-up or shut-down of the machine. The softer core of the shaft 160 is useful in situations where the rotating machine 100 may be exposed to low temperature environments because the softer core is less brittle than the hard outer surface and therefore less prone to fracture. A spiral groove 850 is formed in the outer surface of the shaft 160. The spiral groove 850 acts to circulate fluid within the bearing assembly, making the shaft 160 an integral part of the bearing system.

Figure 9B:
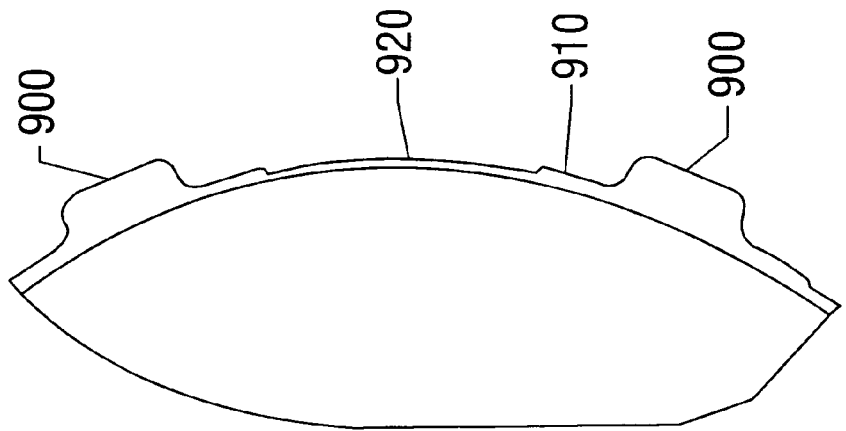
FIG. 9b illustrates a magnified view of a portion of the rotor assembly of FIG. 9a without permanent magnets.
Figure 9A:
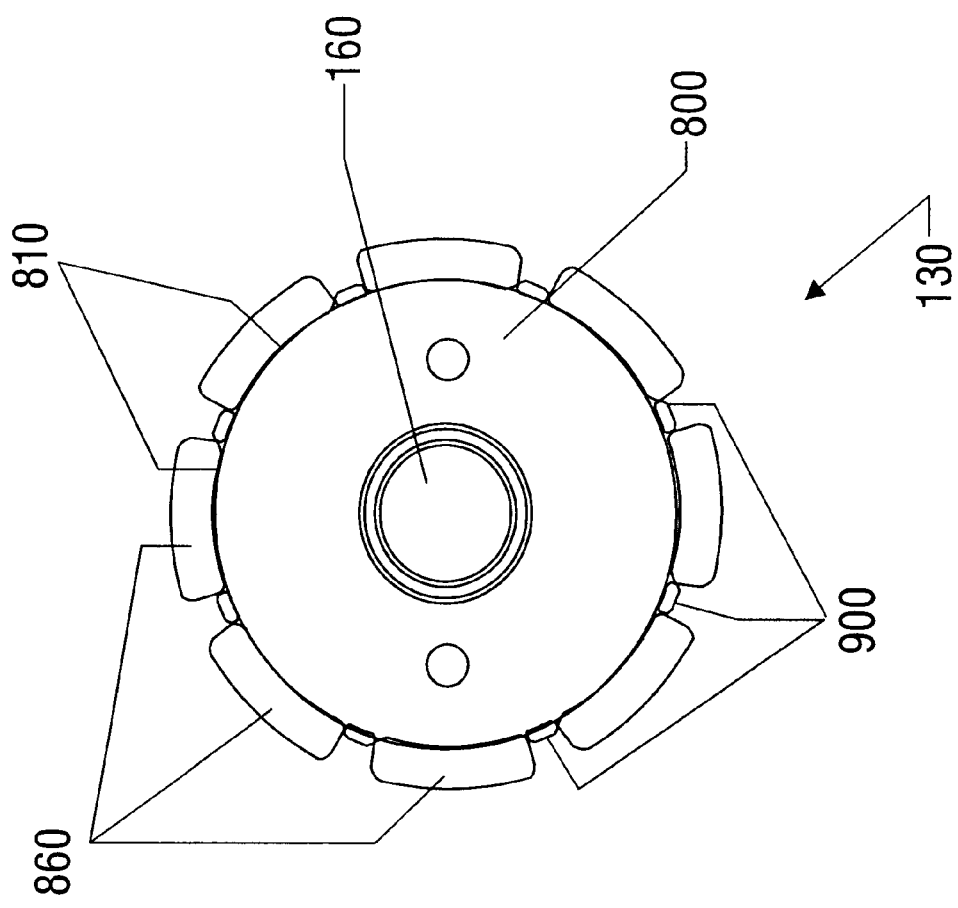
FIG. 9a illustrates an end view of the rotor assembly of FIG. 8.

As best shown in FIGS. 9A and 9B, the outer surface 810 of the rotor member 800 includes a plurality of projecting ribs 900 that define a corresponding plurality of recesses 910 for receiving a corresponding plurality of magnets 860. Preferably, the rotor member 800 includes eight ribs 900 defining eight recesses for receiving eight magnets 860 of alternating polarity. Any type of commercially available permanent magnet may be utilized, and preferably a neodymium magnet is used. The rotor magnets 860 act to transmit magnetic signals to the sensor assembly 120, which in turn transmits electrical signals to a controller to control the speed of the rotating machine. The magnets 860 may be further secured in the recesses by application of a layer of adhesive material between the magnet and the outer surface 810 of the rotor member 800.

The shear strength of the adhesive material holding the permanent magnet members 860 to the rotor member 800 depends, to a great extent, on the thickness of the layer of adhesive or glue between the magnets 860 and the outer surface 810 of the rotor member 800. To ensure that this glue thickness is within an acceptable range, a secondary recess or "glue trough" 920 is formed within each main recess 910 defined by the outer surface 810 of the rotor member 800. The depth of the glue trough depends upon the type of adhesive used. According to one embodiment, the adhesive used is a single-part, heat cured epoxy, and the optimal depth of the glue trough is between about 0.05 mm and 0.15 mm.

The ribs 900 help properly position the permanent magnets 860 within the recesses 910 and also help resist the effects of torque on the magnets 860 in the event that the attachment means (e.g. glue) affixing the magnets 860 to the rotor member 800 fails.

During fabrication of the rotor assembly 130, the magnets 860 are first secured in the recesses 910. A layer of adhesive material is applied to the surface of the rotor member 800 in the main recess 910, filling the glue trough 920. The permanent magnets 860 are then placed within the main recesses 910, and the magnets 860 are compressed against the rotor member 800. Some of the glue will collect in the glue trough 920, and the remainder will be extruded out of the main recess 910. Thus, after this compression, the thickness of the glue layer between the permanent magnets 860 and the rotor member 800 will depend, to a great extent, on the depth of the glue trough 920.

Before the magnets 860 are secured to the rotor member 800, the rotor member and shaft 160 are assembled, preferably by inserting a beveled first end 880 of the shaft into the opening in an end of the rotor member. The shaft 160 may be coated with a light oil prior to press fitting into the rotor member 800 to ease the assembly. Care must be taken to ensure that the shaft outer surface and the inner surface of the stepped portion 830 of the rotor member 800 are free of burrs and foreign material, since the assembly is very susceptible to contamination after magnetization.

Finally, according to the embodiment shown in FIG. 8, an encapsulation layer or insert molding 870 may be provided surrounding the rotor member 800 with attached permanent magnets 860, to serve as a further backup retention means should the adhesive fail. Alternatively, the encapsulating layer or insert molding 870 may serve as the primary magnet 860 retainer, where glue is not used to adhere the magnet 860 to the rotor member 800. The encapsulation layer 870 may be formed by placing the assembled rotor member 800 into a plastic injection tool and molding a plastic about the outer surfaces thereof Preferably, the encapsulation layer or insert molding 870 comprises glass-filled nylon.

The size of the air gap between the stator assembly 140 and the magnets 860 of the rotor assembly 130 is important in determining the efficiency of the rotating machine 100. At full load a smaller air gap results in a more efficient machine. At full load, the viscous drag between the rotor assembly 130 and the stator assembly 140 is not a major contributor to the load on the machine 100. However, under no load or low load conditions, the viscous drag component is a major contributor to the load on the machine 100. As the size of the air gap decreases, the viscous drag increases. In cases where the machine 100 is used intermittently, such as in a power steering pump application, the machine is frequently operated with little or no load. Therefore, it is important to balance the improved efficiency at full load with the increased viscous drag caused by the smaller air gap and its effect under no or low load conditions. In the illustrated embodiment, the air gap is between about 0.008 and 0.012 inches.

Figure 10B:
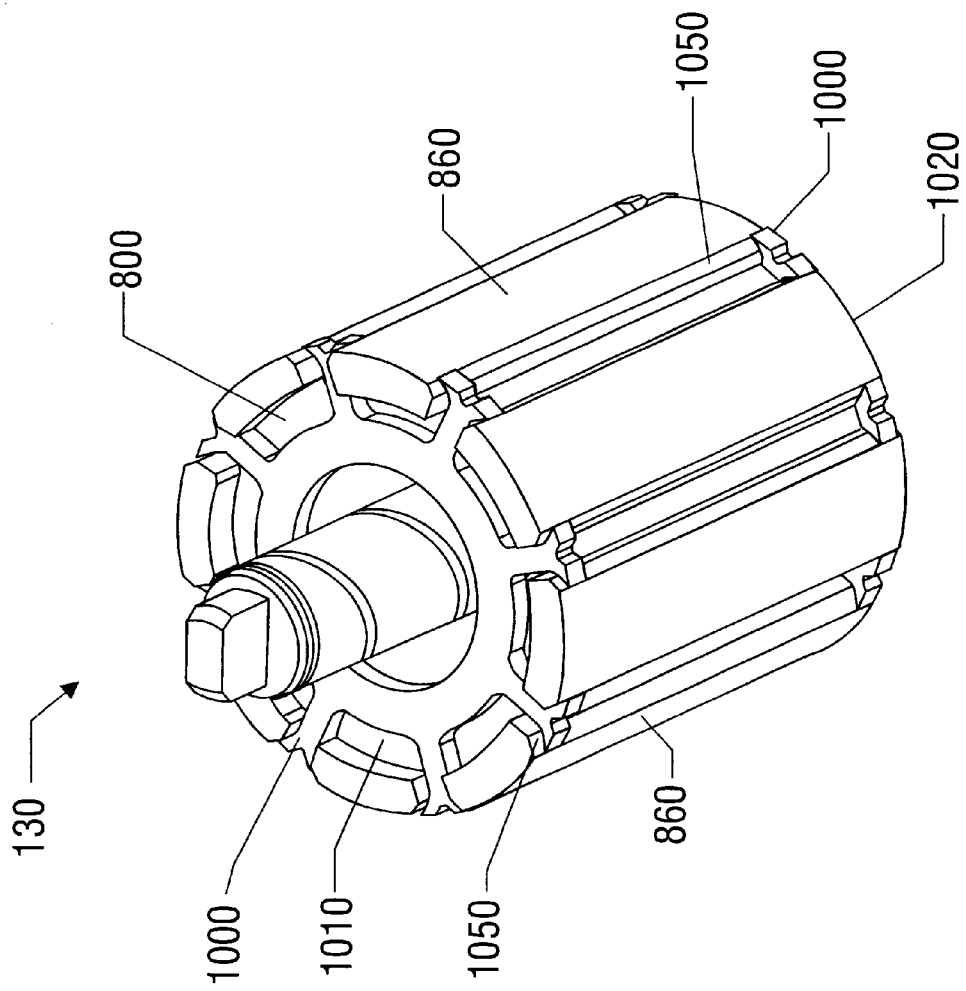
FIGS. 10a and 10b illustrate a rotor assembly according to an alternative embodiment including star-shaped retainers used to secure the magnets to the rotor assembly of FIG. 8.
Figure 10A:
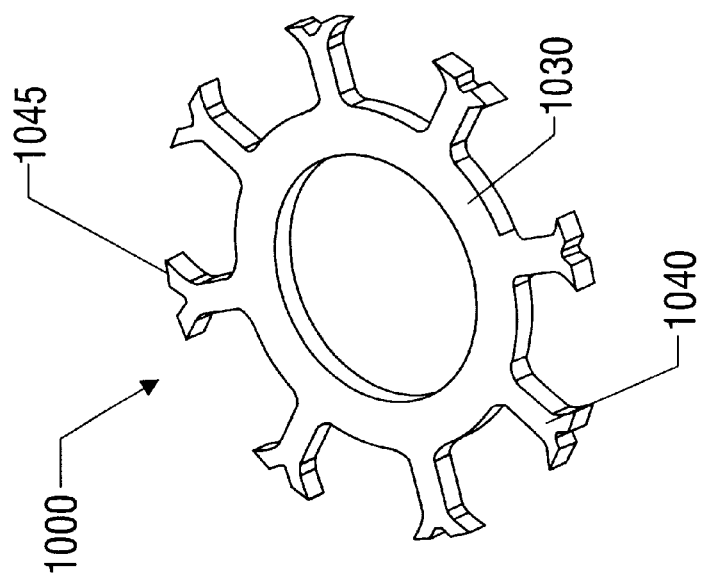

Two alternate means for securing the magnets 860 to the rotor member 800 are shown in FIGS. 10 and 11. These alternative securing means may act as a secondary system to retain the magnets 860 on the rotor member 800 in addition to the primary securing means which is the glue or adhesive. The alternate securing means may also be used in conjunction with the encapsulation layer 870 shown in FIG. 8. The alternate securing means may act independently of the glue or adhesive to resist the effects of torque, centrifugal force, and thermal energy exerted on the magnet-rotor interface. The use of both types of alternate securing means to secure the magnets 860 to the rotor member 800 provides operational and manufacturing benefits. Other retention means, including encapsulation and stainless steel wrap, tend to lessen the air gap between the stator assembly 140 and the rotor assembly 130. A smaller air gap results in increased losses due to viscous drag when the rotating machine 100 is submerged and operated in hydraulic fluid. Because the alternate securing means shown in FIGS. 10 and 11 do not extend into the air gap, no increase in viscous drag is apparent. Also, because the air gap is larger than with the other retention means described, the manufacturing tolerances for the stator assembly 140 and the rotor assembly 130 may be less stringent In accordance with the alternate securing means shown in FIGS. 10a and 10b, two star-shaped retainers 1000 are affixed to the ends 1010, 1020 of the rotor member 800 to hold the permanent magnets 860 in place. Each star-shaped retainer 1000 comprises a metallic ring shaped member 1030 having a plurality of radial projections 1040 which correspond to the number of ribs 900 on the rotor member 800. Preferably, eight such radial projections 1040 are present for a rotor having eight ribs 900 separating eight magnets 860. The radial projections 1040 have generally "Y-shaped" terminations 1045, which are configured to engage chamfered edges 1050 of the magnets 860 and do not extend beyond the outer edged of the magnets. The star-shaped retainers 1000 engage the ends 1010, 1020 of the rotor member 800 such that the radial projections 1040 extend through slots between adjacent magnets 860 and the terminations 1045 engage the chamfered edges 1050 of the magnets. The terminations 1045 of the star-shaped retainer 1000 then may be physically deformed to hold the magnets 860 in place. The star-shaped retainer 1000 may be formed from any type of metallic material, and is preferably aluminum. The "Y-shaped" terminations 1045 may be formed by deformation of the terminations after the star shaped retaining members 1000 are placed over the ends 1010, 1020 of the rotor member 800, so that the terminations engage the chamfered surfaces 1050 of the magnets 860.

Figure 11B:
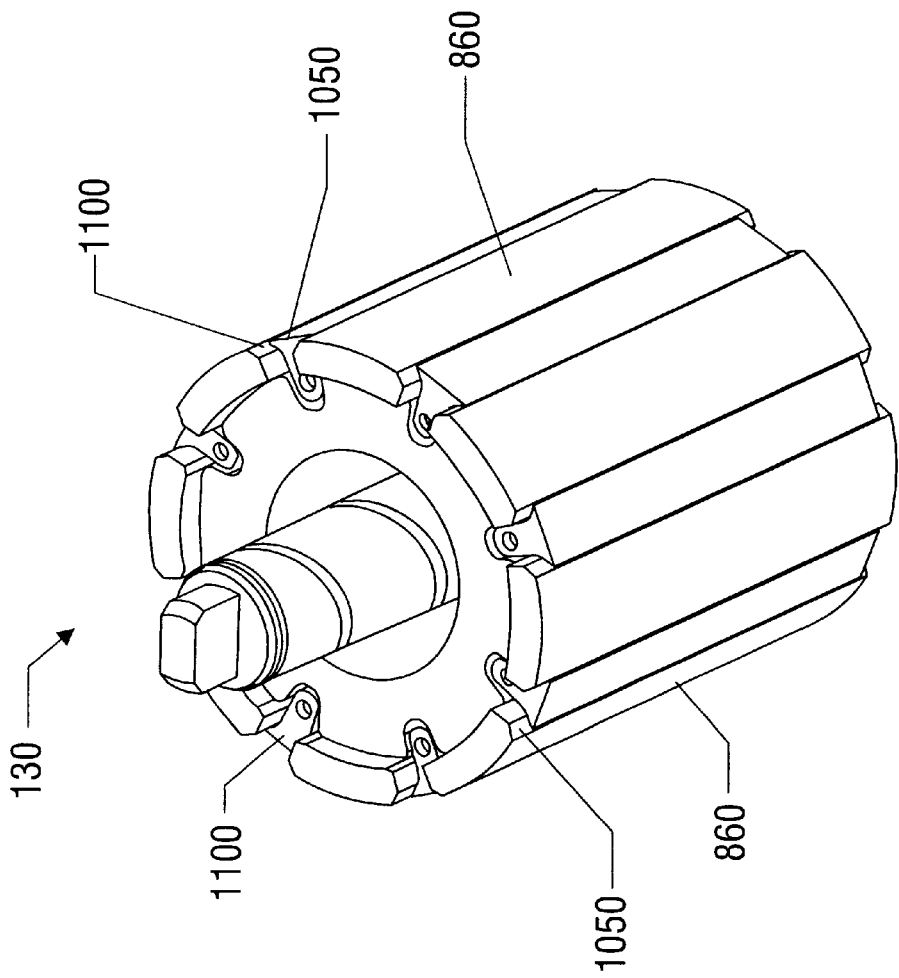
FIGS. 11a and 11b illustrate a rotor assembly according to an alternative embodiment including retaining rod members used to secure the magnets to the rotor assembly of FIG. 8.
Figure 11A:
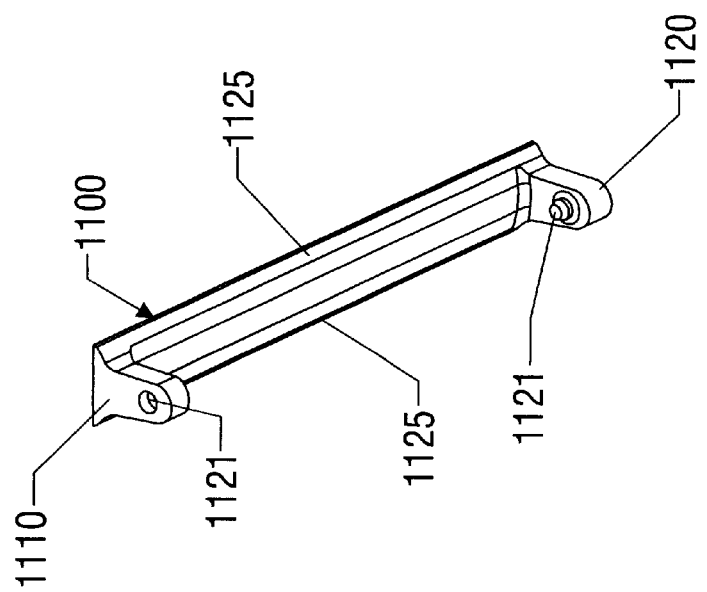

A second alternate securing means for affixing the permanent magnets 860 to the rotor member 800 is shown in FIG. 11. A plurality of elongated retaining members 1100 are provided to hold the magnets 860 in place. The number of elongated retaining members 1100 provided corresponds to the number of ribs 900 and magnets 860, and preferably eight retaining members 1100 are provided. FIG. 11a illustrates one of the retaining members 1100, which includes an elongated region 1105 and two end projections 1120, 1130. The edges 1125 along the underside of the elongated portion 1105 are beveled to engage chamfered surfaces 1050 on the magnets 860. The retainer members 1100 are formed of a metallic material, preferably aluminum. FIG. 11b illustrates a rotor assembly 130 having retaining members 1100 in place to retain the magnets 860. The rotor assembly 130 having retaining means is assembled by first locating the magnets 860 in the recesses 910 formed in the outer surface of the rotor member 800. The magnets 860 may be secured in the recesses by an adhesive if desired The retaining members 1100 then are placed over the rib areas 900. The end projections 1110, 1120 are deformed to create projections 1111, 1121 which extend into holes (not shown) provided in the end faces of the rotor member 800 to secure the members 1100 to the rotor member. The beveled edges 1125 of the retaining members 1100 interface with the chamfered edges 1050 of the magnets 860 and do not extend beyond the magnets.

Figure 12B:
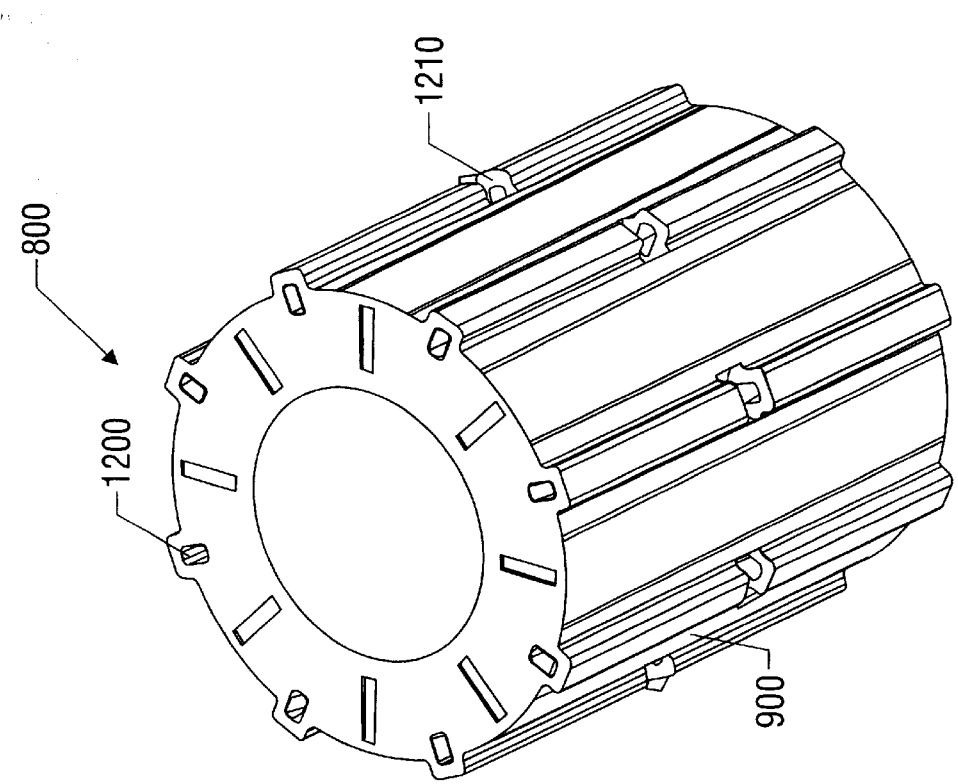
FIGS. 12a and 12b illustrate a rotor assembly according to an alternative embodiment including an encapsulating layer that cooperates with rib undercuts to secure the magnets to the rotor assembly of FIG. 8.
Figure 12A:
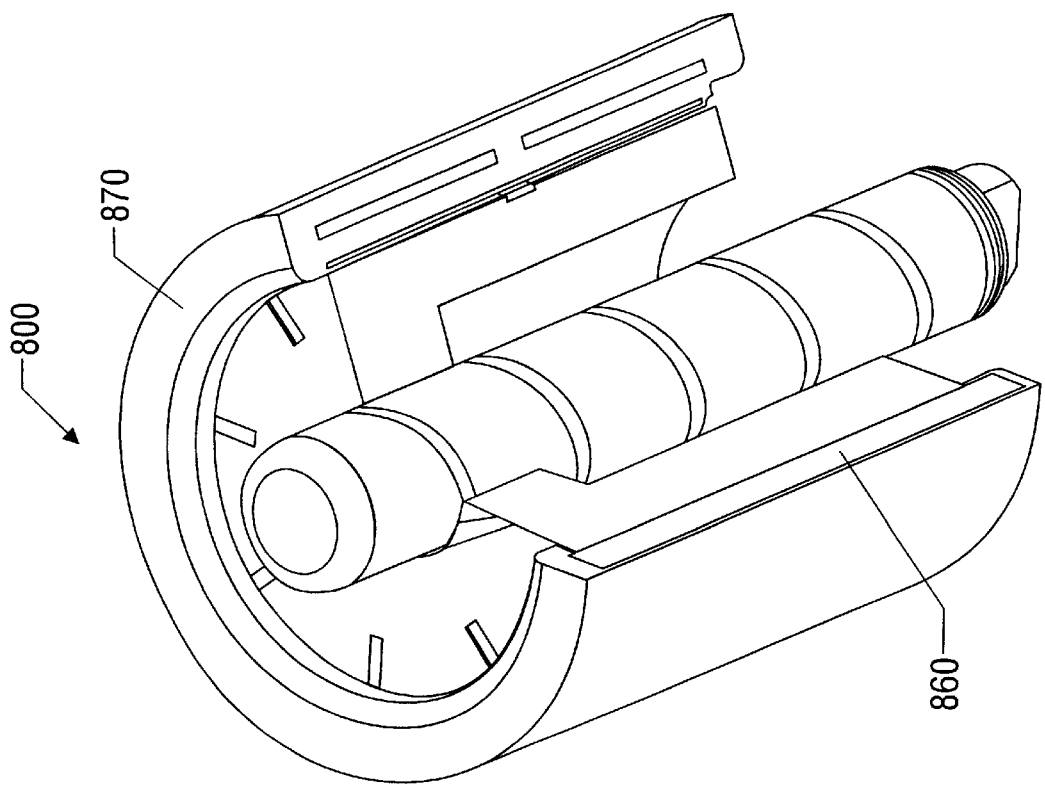

FIG. 12 illustrates an alternate rotor member 800 embodiment which cooperates with the encapsulation layer 870 to mechanically secure the encapsulation layer to the rotor. The ribs 900 define longitudinal bores 1200 extending substantially the entire length of the ribs 900. Also, undercuts 1210, consisting of a notch in the rib 900 are defined in each rib. When the encapsulation layer 870 is formed around the rotor member 800 after the magnets 860 have been attached, the encapsulation layer 870 substantially fills the undercuts 1210 and bores 1200, thus mechanically locking the encapsulation layer 870 to the rotor member 800.

As the motor is assembled, the shaft 160 of the rotor assembly 130 is positioned within the endshield protrusion 150 as shown in FIG. 1. A clip 170 is then used to secure the shaft 160 against axial movement in relation to the endshield 110. A washer is placed between the clip 170 and the endshield 110 to form a thrust bearing as is known in the art. A washer may also be placed about the shaft 160 between the rotor member 800 and the free end of the endshield protrusion 150. No other endshield is required. Moreover, no ball bearing assemblies are used in the rotating machine 100. Instead, the spiral-grooved shaft 160 and the endshield protrusion 150 form a hydrodynamic unit bearing that utilizes the hydraulic fluid in which the motor 100 is submerged for lubrication and cooling. Thrust bearing surfaces are formed between the clip 170 and washer and the endshield 110 and also between the top of the endshield protrusion 150 and the overhanging surface 835 of the step portion 830 which is proximate the endshield protrusion 150 after assembly.

Referring to FIGS. 5 and 8, the sensor assembly 120 orients the Hall devices 530 in the cavity defined between the interior surface 820 of the rotor member 800 and the outer surface of the rotor shaft 160, such that the sensing surface 550 of the Hall devices 530 is proximate the inner surface 865 of the portions of the magnets 860 that protrude beyond the end of the rotor member 800. The cooperation of the stator tab 300, the endshield assembly locating notch 230, the locating posts 250, 260, and the sensor assembly mounting holes 500, 510 ensure that the Hall devices 530 are oriented in a known position with respect to the stator assembly 140. Fixing the location of the Hall devices 530 with respect to the stator assembly 140 simplifies the assembly process. The output of the Hall effect devices 530 is used by a controller attached to the rotating machine 100 to control the timing of the phase winding switching. Due to the fixed orientations, the Hall devices 530 do not have to be adjusted to determine their positions relative to the stator assembly 140 for proper control of the rotating machine 100. The proper alignment is ensured during the manufacturing process due to the locating features.

Figure 14:
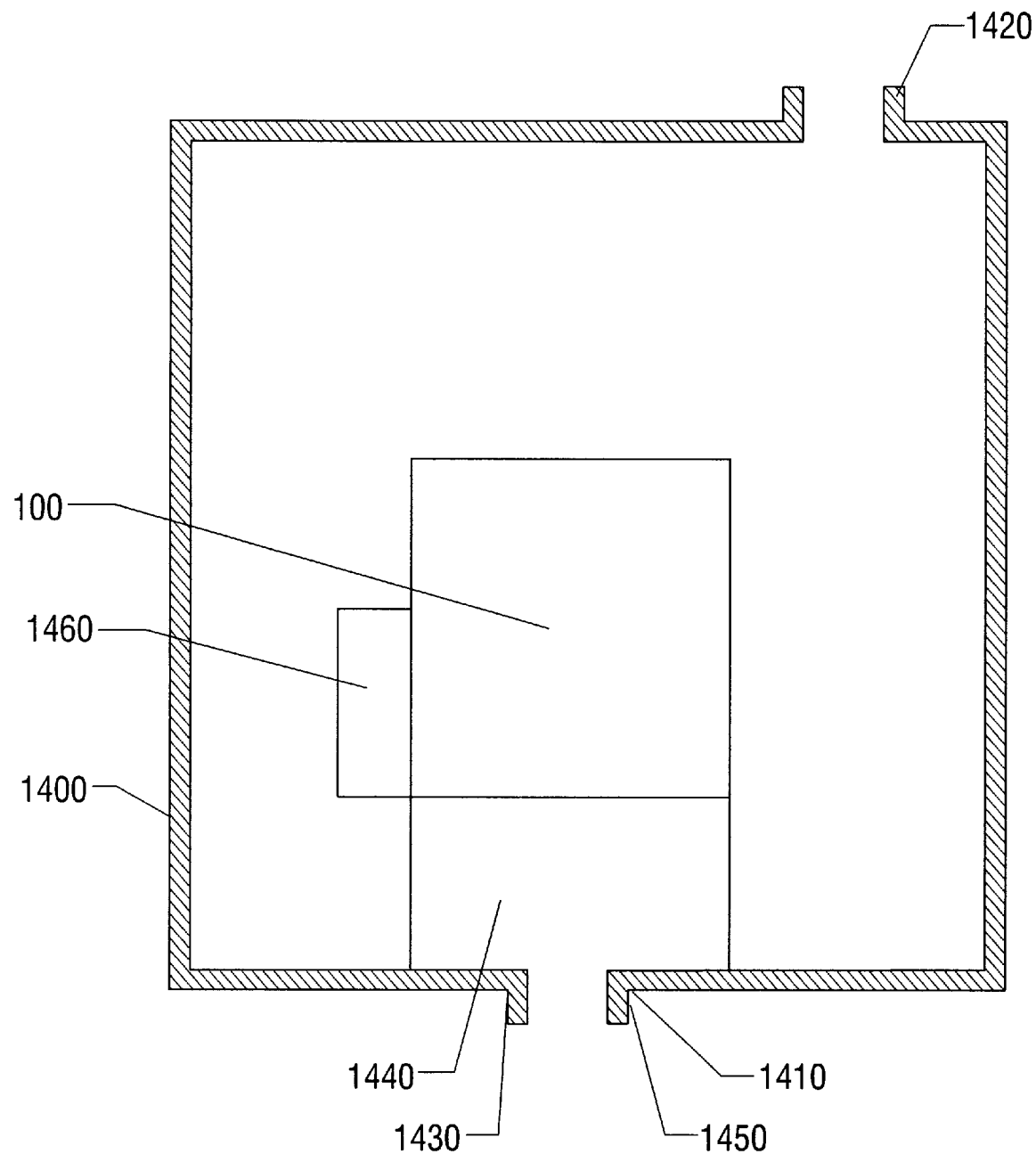
FIG. 14 illustrates a pressurized fluid system according to an embodiment of the invention.

As shown in FIG. 14, the rotating machine 100 may be used in connection with a hydraulic power steering pump 1440 that is driven by the rotating machine 100 instead of a belt drive from the engine of a vehicle. The rotating machine 100 and pump 1440 are submerged in hydraulic fluid within a system housing 1400. The system housing 1400 includes a fluid inlet 1420 and a fluid outlet 1410 that corresponds to a fluid outlet 1450 of the pump 1440. The fluid outlet 1410 is sealed against the pump outlet 1450 by a seal 1430. In operation, the shaft 160 of the rotating machine 100 is connected to an impeller of the power steering pump 1440 and is fully submerged with the pump in power steering fluid. The unit bearing formed by the rotor assembly 130 and the endshield protrusion 150 relies upon the power steering fluid, rather than on ball bearings, to lubricate the shaft. The controller 1460 may also be located within the system housing 1400.

During operation of the rotating machine 100, rotation of the spiral-grooved shaft 160 draws hydraulic fluid through the holes 245 in the endshield 110 into the cavity defined between the outer surface 840 of the rotor shaft 160 and the endshield protrusion 150. The pressure and flow of hydraulic fluid between the outer surface 840 of the shaft 160 and the inner surface of the endshield protrusion 150 creates a lubricating layer between the endshield protrusion, the shaft and the rotor member 800.

In typical power steering pump designs, the motor drive has two endshields and uses ball bearings to lubricate the shaft. The motor is generally separated from the fluid by a seal on the shaft. The use of a ball bearing motor in the presence of hydraulic fluid limits the life expectancy of the ball bearings. The rotating machine 100 of the invention uses a single endshield and a unit bearing and is not susceptible to degradation from the power steering fluid as is the case with a ball bearing design. The unit bearing has improved reliability over ball bearing systems, in that it has improved resistance to shock and contamination, and thus has a longer expected life. The single endshield design also reduces the size and complexity of the completed assembly, simplifies the assembly of a magnetized rotor, and is ideally suited for automated assembly.

Those skilled in the art will now see that certain modifications can be made to the apparatus and methods herein disclosed with respect to the illustrated embodiments, without departing from the spirit of the instant invention. And while the invention has been described above with respect to the preferred embodiments, it will be understood that the invention is adapted to numerous rearrangements, modifications, and alterations, and all such arrangements, modifications, and alterations are intended to be within the scope of the appended claims.

What is claimed is:

1. A rotating machine comprising:
   an endshield assembly including an endwall and a cylindrical endshield protrusion projecting therefrom;
   a stator assembly connected to the endshield assembly and having a main body extending from the endwall substantially parallel to the endshield protrusion; and
   a rotor assembly positioned within a central cavity of the stator assembly and arranged for rotation relative to the stator assembly; the rotor assembly including a shaft extending therefrom and passing through the cylindrical endshield protrusion;
   wherein an outer surface of the shaft and an inner surface of the cylindrical endshield protrusion form a hydrodynamic bearing when the rotating machine is immersed in fluid.

2. The rotating machine according to claim 1, wherein the outer surface of the shaft has a spiral groove formed therein.

3. The rotating machine according to claim 1, wherein the shaft is press fitted through an opening in the rotor such that a first end of the shaft is secured to the rotor assembly.

4. The rotating machine according to claim 1, wherein one of the endshield assembly and stator assembly includes a positioning notch while the other of the endshield assembly and stator assembly includes a corresponding positioning projection.

5. The rotating machine according to claim 4, wherein the endshield assembly includes a planar surface and a cylindrical sidewall extending substantially perpendicular from an outer edge of the planar surface, the notch being formed in an outer endface thereof, and the projection extending radially outward from an outer surface of the stator assembly.

6. The rotating machine according to claim 1, wherein the endshield assembly includes a plurality of openings in the endwall thereof for allowing fluid to circulate between the rotating machine and a load to which the rotating machine is attached.

7. The rotating machine according to claim 1, further including a sensor assembly mounted to the endshield assembly proximate to the rotor assembly.

8. The rotating machine according to claim 7, further including means for locating and aligning the sensor assembly within the endshield assembly and in relation to the stator assembly.

9. The rotating machine according to claim 8, wherein the locating and aligning means includes one or more posts for positioning and aligning a locator body of the sensor assembly, and the locator body includes one or more openings therein, the openings corresponding to the one or more posts.

10. The rotating machine according to claim 7, wherein the sensor assembly includes:
    a locator body having a plurality of pockets formed in a surface thereof, and a sensor positioned in each of the plurality of pockets.

11. The rotating machine according to claim 10, wherein the sensor assembly further includes:
    a printed circuit board array electrically connected to the sensors; and
    lead wires for connecting the printed circuit board to a controller.

12. The rotating machine according to claim 11, further including:
    a channel located in a wall of the endshield assembly and having a longitudinal opening therein for receiving a length of the lead wires; and
    a grommet having a longitudinal opening therein to permit radial insertion of the lead wires, the grommet being positioned in the longitudinal opening of the channel such that the grommet surrounds the lead wires and spans the longitudinal opening of the channel.

13. The rotating machine according to claim 10, wherein the sensor is a hall effect device.

14. The rotating machine according to claim 10, wherein the plurality of pockets includes three pockets and three corresponding sensors are provided.

15. The rotating machine according to claim 1, wherein the rotor assembly comprises:
    a substantially cylindrical main rotor member having an outer surface;
    a plurality of longitudinal ribs projecting from the outer surface of the main rotor member;
    a plurality of primary recesses defined in the outer surface between adjacent ribs;
    a secondary recess being defined in the outer surface within each primary recess;
    a permanent magnet positioned within each primary recess; and
    a layer of adhesive between each magnet and the outer surface of the main rotor member, wherein the adhesive fills the secondary recess and the thickness of the adhesive depends on the depth of the secondary recess.

16. A rotating machine comprising:
    an endshield assembly including an endwall and a cylindrical endshield protrusion projecting therefrom;
    a stator assembly connected to the endshield assembly and having a main body extending from the endwall substantially parallel to the endshield protrusion;
    a rotor assembly positioned within a central cavity of the stator assembly and arranged for rotation relative to the stator assembly; the rotor assembly including a shaft extending therefrom and passing through the cylindrical endshield protrusion; and
    a sensor assembly mounted to the endshield assembly proximate to the rotor assembly, the sensor assembly including:
      a locator body having a plurality of pockets formed in a surface thereof;
      a sensor positioned in each of the plurality of pockets;
      a printed circuit board array electrically connected to the sensors; and
      lead wires connecting the printed circuit board to a controller,
    wherein the endshield assembly includes:
      a channel located in a wall of the endshield assembly and having a longitudinal opening therein for receiving a length of the lead wires; and
      a grommet having a longitudinal opening therein to permit radial insertion of the lead wires, the grommet being positioned in the longitudinal opening of the channel such that the grommet surrounds the lead wires and spans the longitudinal opening of the channel.

17. A rotating machine comprising:

an endshield assembly including:
- an endwall;
- a cylindrical endshield protrusion projecting from the endwall;
- a channel located in a wall of the endshield assembly and having a longitudinal opening therein for receiving a length of a plurality of lead wires carrying electrical signals; and
- a grommet having a longitudinal opening therein to permit radial insertion of the lead wires, the grommet being positioned in the longitudinal opening of the channel such that the grommet surrounds the lead wires and spans the longitudinal opening of the channel;

a stator assembly connected to the endshield assembly and having a main body extending from the endwall substantially parallel to the endshield protrusion; and a rotor assembly positioned within a central cavity of the stator assembly and arranged for rotation relative to the stator assembly; the rotor assembly including a shaft extending therefrom and passing through the cylindrical endshield protrusion.

* * * * *